2,967,866
N-(p-CHLOROBENZYL) CYCLOSERINE

Edward B. Hodge, Terre Haute, Ind., assignor to Commercial Solvents Corporation, New York, N.Y., a corporation of Maryland No Drawing. Filed Apr. 7, 1959, Ser. No. 804,575

4 Claims. (Cl. 260—307)

My invention relates to substituted cycloserine and more particularly it relates to N-(p-chlorobenzyl)cycloserine and to a method for producing same.

Cycloserine, an antibiotic active against many gram positive and gram negative bacteria, is described in U.S. Patent No. 2,773,887. It is an amphoteric substance which is used medically in the free base form. While cycloserine in the free base form is a useful antibiotic, it does not remain stable when stored for an extended period of time. The free base being highly hygroscopic rapidly loses its antibiotic potency in the presence of moisture.

I have now discovered a new substituted cycloserine compound which possesses the antibiotic properties of cycloserine and which possesses the important advantageous properties of remaining stable at usual storage temperatures in the presence of substantial amounts of moisture over an extended period of time. My new compound possesses the therapeutic utility of ordinary cycloserine free base and also acts as a hypnotic agent.

The new compound of my invention can be prepared by catalytically hydrogenating in the presence of a palladium catalyst N-(p-chlorobenzylidine)cycloserine. The method of preparing the starting materials is described in my co-pending application, Serial No. 804,576, which shows preparation of the compound by reacting cycloserine and p-chlorobenzaldehyde in a solvent inert to the reactants and the reaction products at temperatures ranging from about 25–100° C. and recovering the produced compounds. Hydrogenation can be conducted in the presence of palladium at pressures below 1500 p.s.i. and at temperatures ranging from about 25–100° C. However, I prefer to conduct the hydrogenation at pressures from about 20–50 p.s.i. and at temperatures of from about 4–60° C. The hydrogenation is preferably carried out in the presence of solvents inert to the reactants and the reaction products such as for example lower aliphatic alcohols. My new compound can be recovered by filtering the reaction mixture, concentrating and filtering the filtrate.

The following example is offered to illustrate my invention and it is to be understood that I do not intend to be limited to the exact amounts and procedures set forth therein.

EXAMPLE

To 150 ml. of methanol were added 5 grams of cycloserine and 5 grams of p-chlorobenzaldehyde. The resulting mixture was stirred for ten minutes at room temperature and at atmospheric pressure and the resulting p-chlorobenzylidine cycloserine formed was then hydrogenated without separation at 30 p.s.i. at 15° C. in the presence of 0.5 gram 5% palladium on char until $\frac{1}{20}$ mole of hydrogen had been absorbed. (Total absorption time was about 10 minutes.) The reduction mixture was concentrated to 25 mls. under reduced pressure, cooled for about 3 hours at 10° C. and filtered to give 5.7 grams of the reaction product, N-(p-chlorobenzyl)-cycloserine. The N-(p-chlorobenzyl)cycloserine had a melting point of 145–148° C.

N-(p-chlorobenzyl)cycloserine showed antibacterial activity. The antibacterial activity of my new compound is set out in the table below which shows minimum inhibitory concentrations in ug./ml. and compounds tested against *Staphylococcus aureus*.

*Minimum inhibitory concentration against Staphylococcus aureus (ug./ml.)*

N-(p-chlorobenzyl)cycloserine _____ 500–>500

Now having described my invention, what I claim is:
1. N-(p-chlorobenzyl)cycloserine.
2. In a process for the preparation of N-(p-chlorobenzyl)cycloserine the step which comprises subjecting N-(p-chlorobenzylidine)cycloserine to hydrogenation in the presence of palladium catalyst at temperatures ranging from about 25–100° C. and at pressures below 1500 p.s.i.
3. The process of claim 2 wherein the pressures are from 20 to 50 p.s.i. and the temperatures are from 40 to 60° C. and the compound hydrogenated is N-(p-chlorobenzylidine)cycloserine.
4. The process of claim 2 wherein the hydrogenation is carried out in a solvent inert to the reactants and the reaction products.

References Cited in the file of this patent
UNITED STATES PATENTS 2,840,565    Holly et al. _____ June 24, 1958

FOREIGN PATENTS 722,679    Great Britain _____ Jan. 26, 1955

OTHER REFERENCES

Houben: Die Methoden der Org. Chemie, vol. 2, p. 347 (1943).